(12) United States Patent
Wang et al.

(10) Patent No.: US 9,569,862 B2
(45) Date of Patent: Feb. 14, 2017

(54) BANDWIDTH REDUCTION USING TEXTURE LOOKUP BY ADAPTIVE SHADING

(71) Applicant: QUALCOMM Incorporated, San Diego, CA (US)

(72) Inventors: Yida Wang, Markham (CA); Shiu Wai Hui, Richmond Hill (CA); Stewart Chao, Markham (CA)

(73) Assignee: QUALCOMM Incorporated, San Diego, CA (US)

( * ) Notice: Subject to any disclaimer, the term of this patent is extended or adjusted under 35 U.S.C. 154(b) by 82 days.

(21) Appl. No.: 14/628,935

(22) Filed: Feb. 23, 2015

(65) Prior Publication Data

US 2016/0048980 A1    Feb. 18, 2016

Related U.S. Application Data

(60) Provisional application No. 62/037,785, filed on Aug. 15, 2014.

(51) Int. Cl.
| | | |
|---|---|---|
| G06T 11/00 | (2006.01) | |
| G06T 15/00 | (2011.01) | |
| G06T 11/40 | (2006.01) | |
| G09G 5/02 | (2006.01) | |
| H04N 1/46 | (2006.01) | |
| H04N 1/60 | (2006.01) | |
| H04N 9/69 | (2006.01) | |

(52) U.S. Cl.
CPC .............. *G06T 11/001* (2013.01); *G06T 11/40* (2013.01); *G06T 15/005* (2013.01)

(58) Field of Classification Search
CPC combination set(s) only.
See application file for complete search history.

(56) References Cited

U.S. PATENT DOCUMENTS

| | | | |
|---|---|---|---|
| 6,771,264 B1 * | 8/2004 | Duluk ................... | G06T 15/005 345/426 |
| 6,778,181 B1 | 8/2004 | Kilgariff | |
| 6,788,304 B1 | 9/2004 | Hart et al. | |
| 8,035,650 B2 * | 10/2011 | Du ......................... | G06F 9/3802 345/542 |
| 8,228,328 B1 * | 7/2012 | French .................... | G06T 15/40 345/421 |
| 8,587,602 B2 | 11/2013 | Grossman et al. | |
| 8,605,104 B1 | 12/2013 | McAllister et al. | |
| 2002/0060684 A1 | 5/2002 | Alcorn et al. | |
| 2004/0189652 A1 | 9/2004 | Emberling | |
| 2005/0273712 A1 | 12/2005 | Smith et al. | |

(Continued)

OTHER PUBLICATIONS

US 8,682,092, 03/2014, Tetsugo (withdrawn)
International Search Report and Written Opinion—PCT/US2015/040171—ISA/EPO—Oct. 13, 2015.

*Primary Examiner* — Wesner Sajous
(74) *Attorney, Agent, or Firm* — Haynes and Boone, LLP

(57) ABSTRACT

An example method of providing a solid texture map to a graphics processing unit (GPU) includes dividing a tile of renderable content into a plurality of partitions. The method also includes determining that a set of partitions of the plurality of partitions is a solid color. The method further includes generating a solid texture map indicating that the set of partitions of the plurality of partitions is a solid color. The method also includes providing access to the solid texture map to a GPU.

20 Claims, 6 Drawing Sheets

(56) References Cited

U.S. PATENT DOCUMENTS

| | | |
|---|---|---|
| 2006/0268012 A1 | 11/2006 | MacInnis et al. |
| 2007/0182738 A1* | 8/2007 | Feldman ................ G06T 15/20 345/427 |
| 2009/0160857 A1* | 6/2009 | Rasmusson ............. G06T 15/04 345/422 |
| 2009/0228782 A1 | 9/2009 | Fraser |
| 2012/0001925 A1 | 1/2012 | Andonieh et al. |
| 2012/0274625 A1 | 11/2012 | Lynch |
| 2013/0229414 A1* | 9/2013 | Gruber .................... G06T 15/40 345/426 |
| 2014/0152683 A1 | 6/2014 | Nystad et al. |
| 2014/0176578 A1 | 6/2014 | Meixner |
| 2014/0267346 A1* | 9/2014 | Ren ......................... G06T 15/04 345/582 |

\* cited by examiner

BANDWIDTH REDUCTION USING TEXTURE LOOKUP BY ADAPTIVE SHADING

CROSS REFERENCE TO RELATED APPLICATIONS

This application claims the benefit of priority from U.S. provisional patent application No. 62/037,785, filed Aug. 15, 2014, which is incorporated by reference.

FIELD OF DISCLOSURE

The present disclosure generally relates to graphics processing systems, and more particularly to rendering textures in a graphics processing system.

BACKGROUND

Computing devices may be equipped with one or more high-performance graphics processing units (GPUs) that provide high performance with regard to computations and graphics rendering. Computing devices may use a GPU to accelerate the rendering of graphics data for display. Examples of such computing devices may include a computer workstation, mobile phones (e.g., smartphones), embedded systems, personal computers, tablet computers, and video game consoles.

Rendering generally refers to the process of converting a three-dimensional (3D) graphics scene, which may include one or more 3D graphics objects, into two-dimensional (2D) rasterized image data. In particular, GPUs may include a 3D rendering pipeline to provide at least partial hardware acceleration for the rendering of a 3D graphics scene. The 3D graphics objects in the scene may be subdivided by a graphics application into one or more 3D graphics primitives (e.g., points, lines, triangles, patches, etc.), and the GPU may convert the 3D graphics primitives of the scene into 2D rasterized image data.

BRIEF SUMMARY

This disclosure relates to providing a texture map indicating solid color partitions of a tile. Methods, systems, and techniques for providing the texture map to a GPU are provided.

According to an embodiment, a method of providing a solid texture map to a graphics processing unit (GPU) includes dividing a tile of renderable content into a plurality of partitions. The method also includes determining that a set of partitions of the plurality of partitions is a solid color. The method further includes generating a solid texture map indicating that the set of partitions of the plurality of partitions is a solid color. The method also includes providing access to the solid texture map to a GPU.

According to another embodiment, a system for providing a solid texture map to a GPU includes a tile generator executing on a computing device. The tile generator divides a tile of renderable content into a plurality of partitions and determines that a set of partitions of the plurality of partitions is a solid color. The system also includes a solid texture map generator that generates a solid texture map indicating that the set of partitions of the plurality of partitions is a solid color, and provides access to the solid texture map to a GPU.

According to another embodiment, a computer-readable medium has stored thereon computer-executable instructions for performing operations including: dividing a tile of renderable content into a plurality of partitions; determining that a set of partitions of the plurality of partitions is a solid color; generating a solid texture map indicating that the set of partitions of the plurality of partitions is a solid color; and providing access to the solid texture map to a GPU.

According to another embodiment, an apparatus for providing a solid texture map to a graphics processing unit (GPU) includes means for dividing a tile of renderable content into a plurality of partitions; means for determining that a set of partitions of the plurality of partitions is a solid color; means for generating a solid texture map indicating that the set of partitions of the plurality of partitions is a solid color; and means for providing access to the solid texture map to a GPU.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

Figure 1:
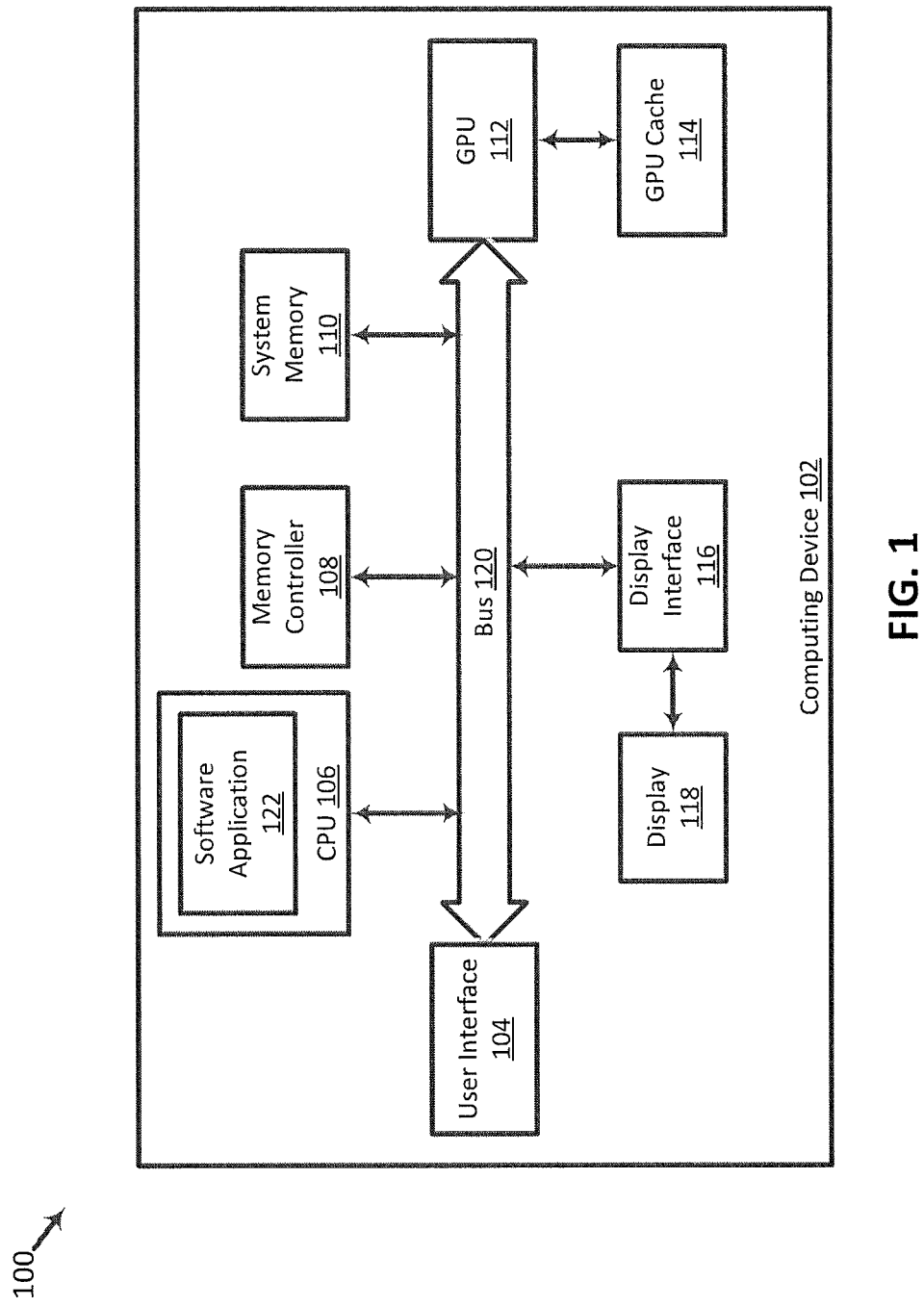
FIG. 1 is a block diagram illustrating a computing device that may be used to implement the rendering techniques of this disclosure, according to some embodiments.

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

Rendering may refer to the process of converting 3D graphics primitives that correspond to 3D objects in a graphics scene into 2D rasterized image data. A computing device may use a graphics processing unit (GPU) including a 3D graphics rendering pipeline to accelerate the rendering of graphics primitives. In particular, the 3D graphics rendering pipeline may include processing stages that are configured to render 3D graphics primitives. The processing stages may include programmable processing stages and fixed-function processing stages. Programmable processing stages may be configured to execute a user-specified program that may be compiled and loaded onto the GPU. Fixed-function processing stages may be hardwired to perform one or more functions, which may be configurable.

In computer graphics, texture mapping is the process of applying an image onto the surface of a primitive. Texture mapping enhances the realism of computer generated imagery and has become an important and critical part of the graphics pipeline. For example, rendering the walls of a house in plain color may provide the appearance of a dull and not very realistic image of the house. To enhance the scene and the graphics, a brick pattern texture may be applied to the walls of the house.

GPUs may include vertex shaders, which operate on every vertex sent to the graphics card, and fragment or pixel shaders, which operate on every pixel to be rasterized. GPUs may also include other types of shaders (e.g., geometry shaders). Fragment shaders calculate the final output color of a pixel that will be stored in the frame buffer. Fragment shaders may use the input variables to color or texture the fragment.

A texture map may refer to a rectangular array of color data. A pixel in texture memory may be referred to as a texel. Texture memory may refer to memory that stores the texture data. The texture map may be mapped to any surface by using texture coordinates. In an example, the texture map is a two-dimensional image (e.g., photograph) having a width and a height. In another example, the texture map is a one-dimensional texture having an arbitrary width and a height of one texel. In another example, the texture map is a three-dimensional texture having a width, height, and depth.

High-quality high-speed texture mapping is typically confined to costly hardware systems. For example, an obstacle faced by designers of texture mapping systems is the requirement of high memory bandwidth to texture memory. High bandwidth is typically necessary because of the high number of accesses to texture memory per second. The GPU may include a shader (e.g., fragment or pixel shader) that computes the color for a fragment or pixel by performing a texture lookup for a texture coordinate. A texture lookup is generally an expensive hardware operation in terms of memory bandwidth, performance, and power.

The cost of excessive texture lookups for one single color is huge because they consume a lot of memory bandwidth as well as power and degrade the performance. It may be desirable to reduce that cost. Others have addressed similar problems using texture compression. Texture compression reduces the size of textures being transferred to GPU memory, but does not address the problem of expensive texture lookups for solid color partitions. Additionally, the encoding and decoding of texture compression is slow and requires extra hardware change.

In rendering content, large portions of the textures may be in solid colors. The present disclosure provides techniques to reduce the memory bandwidth for texture shading using a lookup map for solid color regions. Additionally, the present disclosure may optimize the encoding and decoding of graphics instructions without extra hardware support.

FIG. 1 is a block diagram illustrating a computing device 102 that may be used to implement the rendering techniques of this disclosure, according to some embodiments. Computing device 102 may include a personal computer, a desktop computer, a laptop computer, a computer workstation, a video game platform or console, a wireless communication device (e.g., a mobile telephone, a cellular telephone, a satellite telephone, and/or a mobile telephone handset), a handheld device such as a portable video game device or a personal digital assistant (PDA), a personal music player, a video player, a television, a television set-top box, a server, a mainframe computer or any other type of device that processes and/or displays graphical data.

As illustrated in the example of FIG. 1, computing device 102 includes a user interface 104, a CPU 106, a memory controller 108, a system memory 110, a graphics processing unit (GPU) 112, a GPU cache 114, a display interface 116, a display 118, and bus 120. User interface 104, CPU 106, memory controller 108, GPU 112 and display interface 116 may communicate with each other using bus 120. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

CPU 106 may include a general-purpose or a special-purpose processor that controls operation of computing device 102. A user may provide input to computing device 102 to cause CPU 106 to execute one or more software applications. The software applications that execute on CPU 106 may include, for example, an operating system, a software application 122 (e.g., a word processor application, an email application, a spread sheet application, a media player application, a video game application, a graphical user interface (GUI) application, or a browser), or another program. The user may provide input to computing device 102 via one or more input devices (not shown) such as a keyboard, a mouse, a microphone, a touch pad or another input device that is coupled to computing device 102 via user interface 104.

The software applications that execute on CPU 106 may include one or more graphics rendering instructions that instruct GPU 112 to cause the rendering of graphics data to display 118. In some examples, the software instructions may conform to a graphics application programming interface (API), such as, e.g., an Open Graphics Library (OpenGL®) API, an Open Graphics Library Embedded Systems (OpenGL ES) API, a Direct3D API, an X3D API, a RenderMan API, a WebGL API, or any other public or proprietary standard graphics API. To process the graphics rendering instructions, CPU 106 may issue one or more graphics rendering commands to GPU 112 to cause it to perform some or all of the rendering of the graphics data. In some examples, the graphics data to be rendered may include a list of graphics primitives, e.g., points, lines, triangles, quadrilaterals, triangle strips, etc.

Memory controller 108 facilitates the transfer of data going into and out of system memory 110. For example, memory controller 108 may receive memory read and write commands, and service such commands with respect to system memory 110 in order to provide memory services for the components in computing device 102. Memory controller 108 is communicatively coupled to system memory 110. Although memory controller 108 is illustrated in the example computing device 102 of FIG. 1 as being a processing module that is separate from both CPU 106 and system memory 110, in other examples, some or all of the functionality of memory controller 108 may be implemented on one or both of CPU 106 and system memory 110.

System memory 110 may store program modules and/or instructions that are accessible for execution by CPU 106 and/or data for use by the programs executing on CPU 106. For example, system memory 110 may store user applications and graphics data associated with the applications. System memory 110 may additionally store information for use by and/or generated by other components of computing device 102. For example, system memory 110 may act as a device memory for GPU 112 and may store data to be operated on by GPU 112 as well as data resulting from operations performed by GPU 112. For example, system memory 110 may store any combination of texture buffers, depth buffers, stencil buffers, vertex buffers, frame buffers, or the like. In addition, system memory 110 may store command streams for processing by GPU 112. System memory 110 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data media or an optical storage media.

GPU 112 may be configured to perform graphics operations to render one or more graphics primitives to display 118 and to texture map an image to a pixel for display. Thus, when one of the software applications executing on CPU 106 requires graphics processing, CPU 106 may provide graphics commands and graphics data to GPU 112 for rendering to display 118. The graphics commands may include, e.g., draw call commands, GPU state programming commands, memory transfer commands, general-purpose computing commands, kernel execution commands, etc. In some examples, CPU 106 may provide the commands and graphics data to GPU 112 by writing the commands and graphics data to memory 110, which may be accessed by GPU 112. Graphics data may include a texture map that is stored in system memory 110 and used by GPU 112 to determine the color for a pixel to be rendered on display 118. In some examples, GPU 112 may be further configured to perform general-purpose computing for applications executing on CPU 106.

GPU 112 may, in some instances, be built with a highly-parallel structure that provides more efficient processing of vector operations than CPU 106. For example, GPU 112 may include a plurality of processing units that are configured to operate on multiple vertices, control points, pixels and/or other data in a parallel manner. The highly parallel nature of GPU 112 may, in some instances, allow GPU 112 to render graphics images (e.g., GUIs and two-dimensional (2D) and/or three-dimensional (3D) graphics scenes) onto display 118 more quickly than rendering the images using CPU 106. In addition, the highly parallel nature of GPU 112 may allow GPU 112 to process certain types of vector and matrix operations for general-purposed computing applications more quickly than CPU 106.

GPU 112 may, in some instances, be integrated into a motherboard of computing device 102. In other instances, GPU 112 may be present on a graphics card that is installed in a port in the motherboard of computing device 102 or may be otherwise incorporated within a peripheral device configured to interoperate with computing device 102. In further instances, GPU 112 may be located on the same microchip as CPU 106 forming a system on a chip (SoC). GPU 112 may include one or more processors, such as one or more microprocessors, application specific integrated circuits (ASICs), field programmable gate arrays (FPGAs), digital signal processors (DSPs), or other equivalent integrated or discrete logic circuitry.

GPU 112 may be directly coupled to GPU cache 114. Thus, GPU 112 may read data from and write data to GPU cache 114 without necessarily using bus 120. In other words, GPU 112 may process data locally using a local storage, instead of off-chip memory. This allows GPU 112 to operate in a more efficient manner by reducing the need of GPU 112 to read and write data via bus 120, which may experience heavy bus traffic. In some instances, however, computing device 102 may not include GPU cache 114, but instead GPU 112 may use system memory 110 via bus 120. GPU cache 114 may include one or more volatile or non-volatile memories or storage devices, such as, e.g., random access memory (RAM), static RAM (SRAM), dynamic RAM (DRAM), etc.

CPU 106 and/or GPU 112 may store rendered image data in a frame buffer that is allocated within system memory 110. The software application that executes on CPU 106 may store the image data (e.g., texel colors, width, height, and color depth) in memory 110. The image data may be loaded from an image file or generated using code. Display interface 116 may retrieve the data from the frame buffer and configure display 118 to display the image represented by the rendered image data. In some examples, display interface 116 may include a digital-to-analog converter (DAC) that is configured to convert the digital values retrieved from the frame buffer into an analog signal consumable by display 118. In other examples, display interface 116 may pass the digital values directly to display 118 for processing.

Display 118 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 118 may be integrated within computing device 102. For instance, display 118 may be a screen of a mobile telephone handset or a tablet computer. Alternatively, display 118 may be a stand-alone device coupled to computing device 102 via a wired or wireless communications link. For instance, display 118 may be a computer monitor or flat panel display connected to a personal computer via a cable or wireless link.

Bus 120 may be implemented using any combination of bus structures and bus protocols including first, second, and third generation bus structures and protocols, shared bus structures and protocols, point-to-point bus structures and protocols, unidirectional bus structures and protocols, and bidirectional bus structures and protocols. Examples of different bus structures and protocols that may be used to implement bus 120 include, e.g., a HyperTransport bus, an InfiniBand bus, an Advanced Graphics Port bus, a Peripheral Component Interconnect (PCI) bus, a PCI Express bus, an Advanced Microcontroller Bus Architecture (AMBA) Advanced High-performance Bus (AHB), an AMBA Advanced Peripheral Bus (APB), and an AMBA Advanced eXtensible Interface (AXI) bus. Other types of bus structures and protocols may also be used.

In some examples, the techniques described in this disclosure may be implemented in any of the components in computing device 102 illustrated in FIG. 1 including, e.g., CPU 106, GPU 112, and system memory 110.

Figure 2:
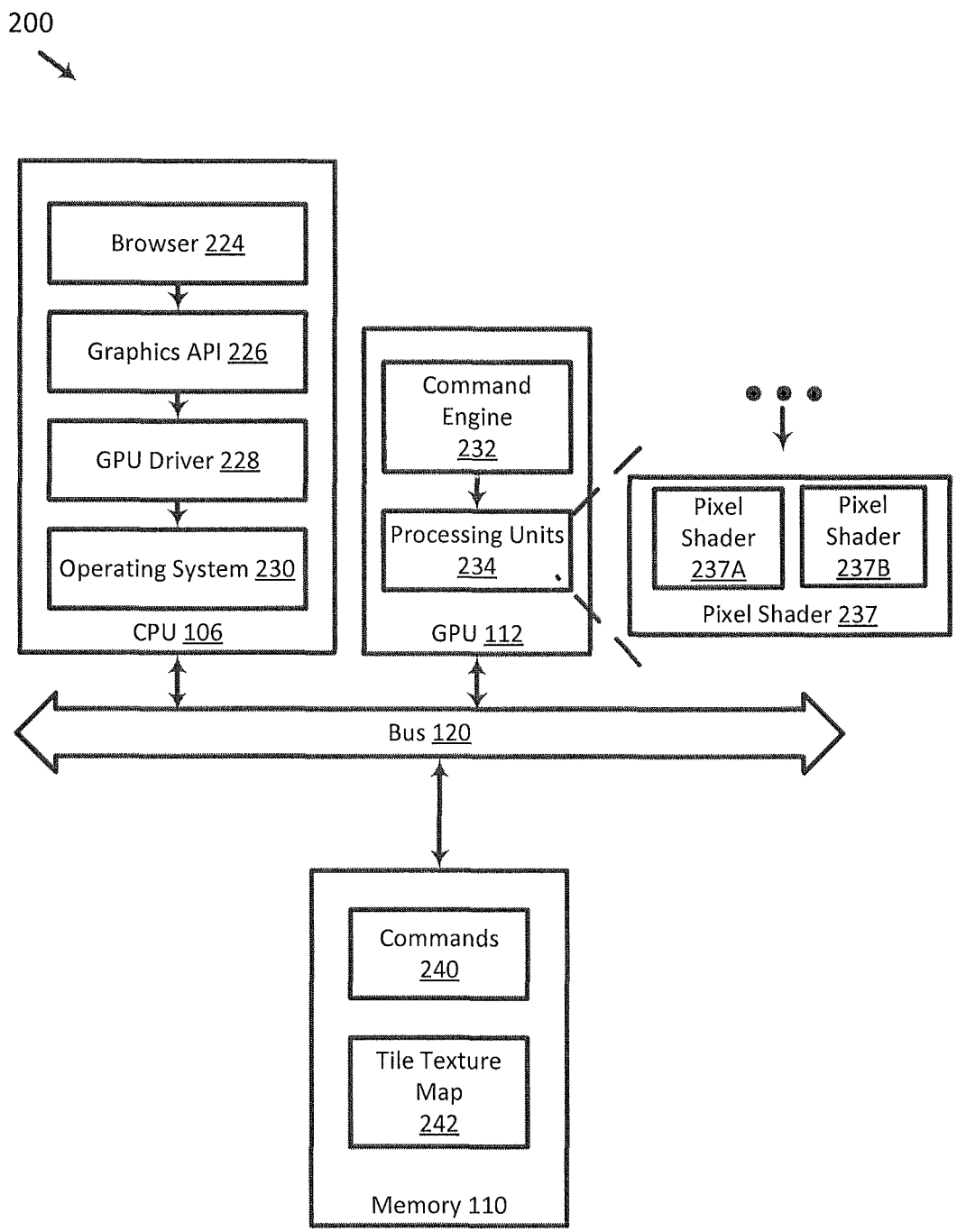
FIG. 2 is a block diagram illustrating a CPU, GPU, and memory of the computing device in FIG. 1 in further detail, according to some embodiments.

FIG. 2 is a block diagram illustrating CPU 106, GPU 112, and memory 110 of computing device 102 in FIG. 1 in further detail, according to some embodiments. As shown in FIG. 2, CPU 106 is communicatively coupled to GPU 112 and memory 110, and GPU 112 is communicatively coupled to CPU 106 and memory 110.

CPU 106 is configured to execute a software application such as browser 224, a graphics API 226, a GPU driver 228, and an operating system 230. Browser 224 may include one or more instructions that cause graphics images to be displayed and/or one or more instructions that cause a non-graphics task (e.g., a general-purposed computing task) to be performed on GPU 112. Although browser 224 may be described as issuing instructions, it should be understood that any software application executable in computing device 102 and that processes and/or displays graphical data may be used to issue the instructions.

Browser 224 may issue instructions to graphics API 226, which may translate the instructions received from browser 224 into a format that is consumable by GPU driver 228. Memory 110 may store one or more commands 240. Commands 240 may be stored in one or more command buffers (e.g., a ring buffer) and include one or more state commands and/or one or more draw call commands. A state command may instruct GPU 112 to change one or more of the state variables in GPU 112, such as, e.g., the draw color. A draw call command may instruct GPU 112 to render a geometry defined by a group of one or more vertices (e.g., defined in a vertex buffer) stored in memory 110 or to draw content of a texture onto display 118.

GPU driver 228 receives the instructions from browser 224, via graphics API 226, and controls the operation of GPU 112 to service the instructions. For example, GPU driver 228 may formulate one or more commands 240, place the commands 240 into memory 110, and instruct GPU 112 to execute the commands 240. In some examples, GPU driver 228 may place the commands 240 into memory 110 and communicate with GPU 112 via operating system 230, e.g., via one or more system calls.

GPU 112 includes a command engine 232 and one or more processing units 234. Command engine 232 is configured to retrieve and execute commands 240 stored in memory 110. In response to receiving a state command, command engine 232 may be configured to set one or more state registers in GPU to particular values based on the state command, and/or to configure one or more of the fixed-function processing units 234 based on the state command. In response to receiving a draw call command, command engine 232 may be configured to cause processing units 234 to render the geometry represented by vertices based on primitive type data stored in memory 110. Command engine 232 may also receive shader program binding commands, and load particular shader programs into one or more of the programmable processing units 234 based on the shader program binding commands.

Processing units 234 may include one or more processing units, each of which may be a programmable processing unit or a fixed-function processing unit. A programmable processing unit may include, for example, a programmable shader unit that is configured to execute one or more shader programs that are downloaded onto GPU 112 from CPU 106. A shader program, in some examples, may be a compiled version of a program written in a high-level shading language, such as, e.g., an OpenGL Shading Language (GLSL), a High Level Shading Language (HLSL), a C for Graphics (Cg) shading language, etc.

In some examples, a programmable shader unit may include a plurality of processing units that are configured to operate in parallel, e.g., an SIMD pipeline. A programmable shader unit may have a program memory that stores shader program instructions and an execution state register, e.g., a program counter register that indicates the current instruction in the program memory being executed or the next instruction to be fetched. The programmable shader units in processing units 234 may include, for example, vertex shader units, pixel shader units, geometry shader units, hull shader units, domain shader units, compute shader units, and/or unified shader units.

The one or more processing units 234 may form a 3D graphics rendering pipeline, which may include one or more shader units that are configured to execute a shader program. Pixel shaders are programs executed on GPU 112. In FIG. 2, processing units 234 may include a fragment shader or pixel shader 237 that computes and sets colors for pixels covered by a texture object (e.g., texture image) displayed on display 118. This process may be referred to as rasterization, which is the conversion from 2D vertices in screen space—each with a z-value (depth-value), and various shading information associated with each vertex—into pixels on the screen. Pixel shader 237 includes a pixel shader 237A and a pixel shader 237B, and is executed for each pixel fragment and uses the interpolated vertex attributes as input to compute a color. Although pixel shader 237A and pixel shader 237B are illustrated as being in pixel shader 237, it should be understood that they may be separate components in the pipeline. A pixel shader can be as simple as returning a constant color. Each pixel fragment that is drawn on display 118 is operated on by pixel shader 237. The term "fragment" and "pixel" may be used interchangeably in the disclosure.

Display 118 may display the contents of tile texture map 242. In an example, a texture image may have texture coordinates (u, v) that are used to look up the right color from tile texture map 242 of a pixel. Pixel shader 237 in GPU 112 may render texture onto an object that is displayed on display 118 and use texture coordinates to look up the color for a pixel in a bound texture map. In an example, pixel shader 237 performs per-pixel shading computations by performing a texture lookup for the current texture coordinate. Accordingly, to look up the color for each pixel, pixel shader 237 may access tile texture map 242 stored in memory 110, which can require high memory bandwidth to texture memory.

Figure 3:
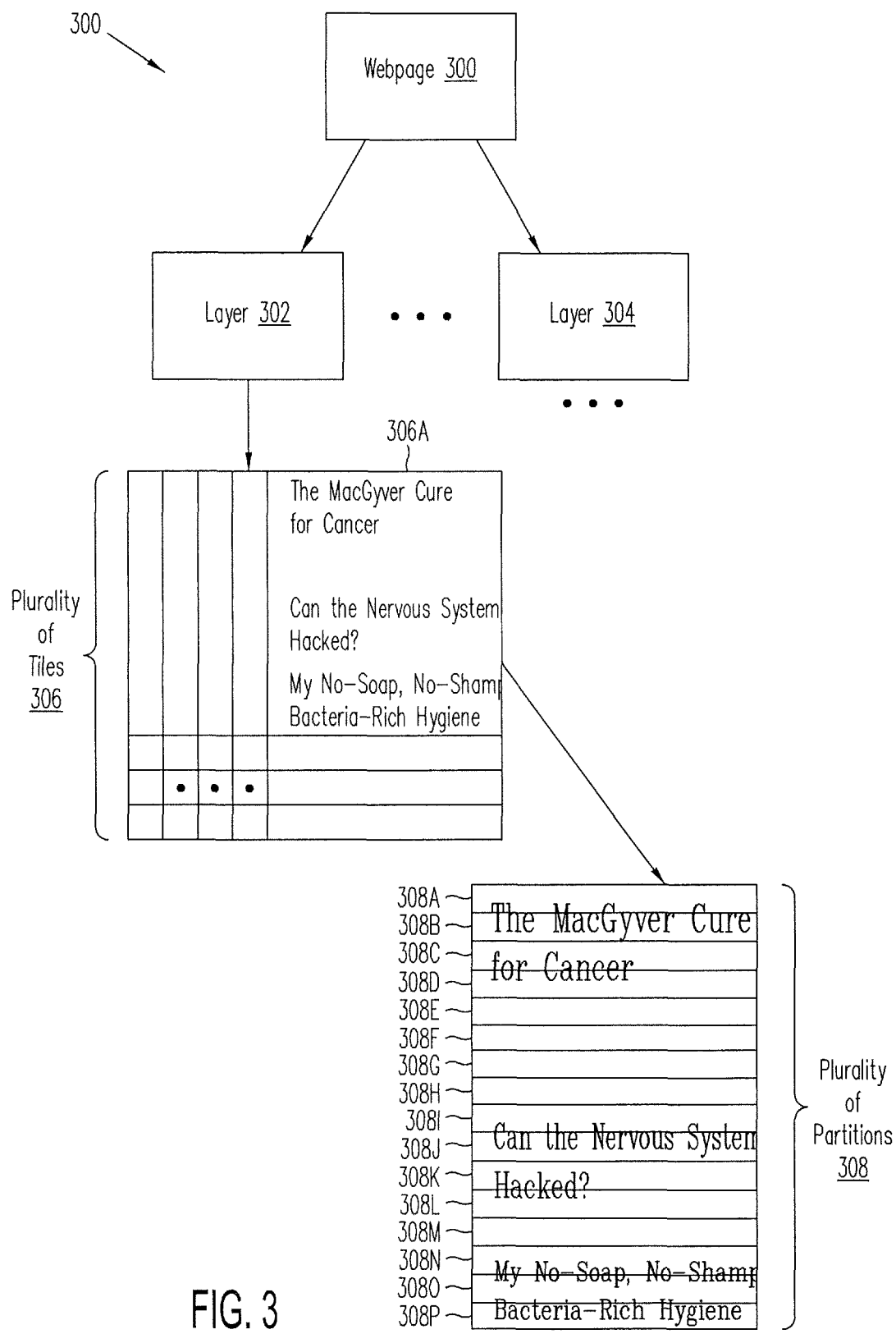
FIG. 3 is a block diagram illustrating renderable content being divided into a plurality of partitions, according to some embodiments.

The present disclosure provides techniques to reduce the memory bandwidth for texture shading using a lookup map for solid color regions of renderable content. FIG. 3 is a block diagram illustrating renderable content being divided into a plurality of partitions, according to some embodiments. Browser 224 may divide renderable content of a webpage 300 into one or more layers. Although a webpage is described as being the renderable content, this is not intended to be limiting and the renderable/rendered content may be any text, image, or graphics on a page (that is or is not associated with a network such as the Internet).

In FIG. 3, webpage 300 is divided into layers 302 and 304. Webpage 300 may have elements or properties that indicate to browser 224 whether to divide the webpage into layers and how many layers. In an example, webpage 300 contains a transparent portion corresponding to layer 302 and an animated portion (e.g., an object moving from one side of display 118 to another side) corresponding to layer 304. In this example, the animated portion of webpage 300 is rendered at a different layer than the transparent portion of webpage 300. Webpage 300 may include multiple layers that may or may not overlap.

For one or more of the layers, browser 224 may divide the respective layer into a plurality of tiles. For example, browser 224 may divide layer 302 into a plurality of tiles 306 including a tile 306A. Layer 302 is divided into tiles 306 of five columns and four rows for a total of 20 tiles. Browser 224 may divide each of the tiles into a plurality of partitions 308. The plurality of partitions may be horizontal or vertical partitions (e.g., for particular languages having a vertical layout direction), and each of the partitions may be of unequal or equal sizes relative to each other. The height or width of each partition may be fine-tuned.

Browser 224 may divide tile 306A into plurality of partitions 308, which includes 16 partitions, partitions 308A-308P. Some of the partitions of plurality of partitions 308 are solid colors and some are not. Browser 224 generates a solid texture map indicating which partition(s) in the tile is a solid color. In an example, browser 224 scans each pixel to generate a solid texture map, and determines which shader to use adaptively (e.g., pixel shader 237A or pixel shader 237B) based on a threshold. Pixel shader 237A may be a "modified" pixel shader that uses the solid texture map to render a pixel on display 118, and pixel shader 237B may be an "unmodified" pixel shader that uses the tile texture map to render a pixel on display 118. For efficiency, it may be desirable for browser 224 to simultaneously scan each pixel to generate the solid texture map and to determine which shader to use in order to scan each pixel only once. If during a first time interval browser 224 scans each pixel to generate a solid texture map and during a second time interval determines which shader to use adaptively based on a threshold, browser 224 may be considered to perform these two actions simultaneously if at least a portion of the first time interval overlaps with at least a portion of the second time interval. Additionally, when browser 224 is confident that a tile is not able to reach the threshold, browser 224 may discard the solid texture map, as it may be necessary for the unmodified shader to use this information. Browser 224 may provide access to the solid texture map to GPU 112. Browser 224 may store the solid texture map into a texture buffer that is accessible by GPU 112.

In some embodiments, if a condition is satisfied, browser 224 provides access to the solid texture map to GPU 112, and GPU 112 may perform an optimized texture lookup operation using the solid texture map. In contrast, if the condition is not satisfied, browser 224 does not provide access to the solid texture map to GPU 112, and GPU 112 may perform a normal texture lookup operation (e.g., uses tile texture map 242 to lookup the texture for the pixel). In an example, the condition is satisfied if the respective tile has a threshold percentage of partitions that is a solid color. In another example, the condition is satisfied if the respective tile has a threshold number of partitions that is a solid color.

Figure 4:
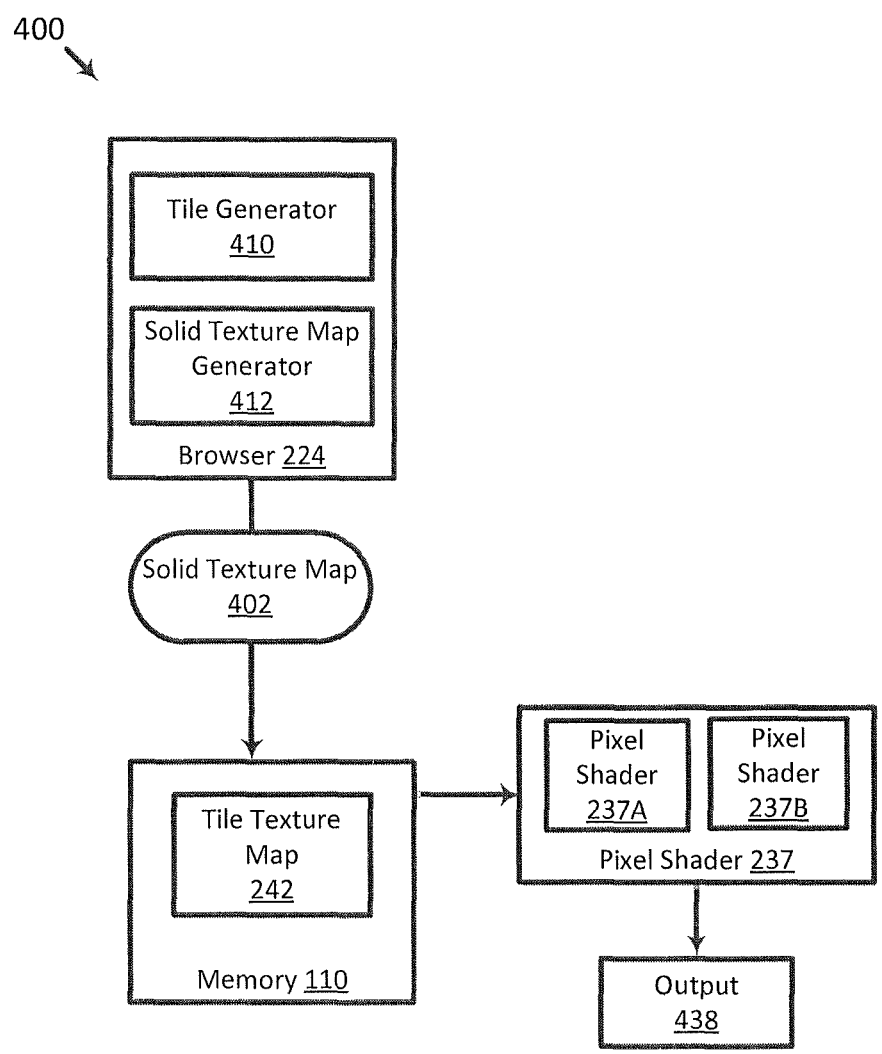
FIG. 4 is a process flow diagram for providing a texture map to the GPU, according to some embodiments.

FIG. 4 is a process flow diagram 400 for providing a texture map to GPU 112, according to some embodiments. Browser 224 may optimize the cost of a texture lookup by using a solid texture map 402 rather than tile texture map 242. It may be desirable to look up a texture using solid texture map 402 because it is typically much smaller than tile texture map 242. Accordingly, the extra cost of computing, storing, and transferring solid texture map 402 may be limited, resulting in less memory being accessed and moved around compared to using tile texture map 242.

Browser 224 includes a tile generator 410 and a solid texture map generator 412. In some embodiments, tile generator 410 generates solid texture map 402 based on content to be rendered and stores solid texture map 402 into texture memory for retrieval by GPU 112. In an example, browser 224 stores solid texture map 402 into memory accessible by CPU 106 and then sends solid texture map 402 into memory accessible by GPU 112. In another example, browser 224 stores solid texture map 402 into memory accessible by CPU 106 and then makes solid texture map 402 also accessible to GPU 112.

Texture memory may be allocated from memory 110. Tile generator 410 determines whether a set of one or more partitions of plurality of partitions 308 is a solid color. For each tile, solid texture map generator 412 may generate a solid texture map indicating whether one or more partitions in the tile is a solid color. In FIG. 3, partitions 308E-308H and 308M are a solid color (e.g., white) and the remaining partitions of plurality of partitions 308 (e.g., 308A-308D, 308I-308L, and 308N-308P) are not a solid color.

Solid texture map 402 may be a small texture map including one entry for each partition in the tile. For example, for tile 306A, solid texture map generator 412 may generate a solid texture map including 16 values, where each value indicates whether a particular partition of plurality of partitions 308 is a solid color. The first value may correspond to partition 308A and the last value may correspond to partition 308P, with the other partitions falling in between in order. In an example, solid texture map 402 includes "FFFFTTTTFFFFTFFF," where "F" indicates that a partition is not a solid color, and "T" indicates that a partition is a solid color. It should be understood that different values may indicate that a partition is a solid color. In other examples, an "F" value or "0" value may indicate that a partition is a solid color. Browser 224 provides access to solid texture map 402 to GPU 112. Browser 224 may store solid texture map 402 in memory 110 for retrieval by GPU 112.

Additionally, for each partition that is a solid color, solid texture map 402 may also indicate the color of the respective partition. In such an example, if the partition is not a solid color, the "color" value may be left blank. A solid texture map that indicates whether a partition is a solid color and its solid color (if applicable) may be advantageous when partitions in a tile are different solid colors.

In another example, tile generator 410 determines whether tile 306A has a major color. A major color is the majority solid color in the tile. Tile generator 410 may scan each partition and for partitions that are a solid color, determine a major color of the tile. In some embodiments, solid texture map generator 412 generates solid texture map 402, where solid texture map 402 includes the major color. The major color may be passed as a uniform to pixel shader 237.

Solid texture map generator 412 may provide a mark in solid texture map 402 that tracks the solid color partitions. For example, if a partition is a solid color that is the same as the major color, solid texture map generator 412 may indicate in the solid texture map that the partition is a solid color. For example, in FIG. 3, tile 306A's major color is white, and solid texture map 402 may include "FFFFTTTTFFFFTFFF" and "white." Additionally, if a partition is not the major color, solid texture map generator 412 may indicate the partition as not being a solid color.

If browser 224 sends the solid texture map including the major color to pixel shader 237, pixel shader 237A may compute the color for each pixel by first checking solid texture map 402, which tracks the solid color partitions, and then determines if the pixel should use the major color. If the pixel does not use the major color, then pixel shader 237B may perform a normal texture lookup operation (e.g., uses tile texture map 242 to lookup the texture for the pixel).

In some embodiments, if a partition is not a solid color, solid texture map generator 412 indicates this in the solid texture map 402. Additionally, if a partition is a solid color that is different from the major color, solid texture map generator 412 may indicate the partition as not being a solid color.

Figure 5:
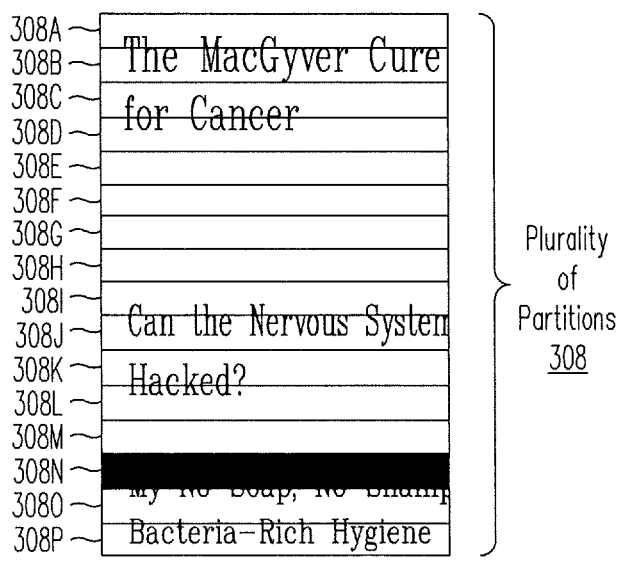
FIG. 5 is an example tile divided into a plurality of partitions, according to some embodiments.

FIG. 5 is an example tile divided into a plurality of partitions, where at least two of the solid color partitions are different colors, according to some embodiments. In FIG. 5, partitions 308E-308H and 308M are a solid white color and partition 308N is a solid black color. Solid texture map 402 may include "FFFFTTTTFFFFTFFF" and "white," where solid texture map 402 indicates that partition 308N is not a solid color, even though it is a solid black color. Accordingly, when pixel shader 237A reads this solid texture map, pixel shader 237A uses the color "white" for partitions 308E-308H and 308M, and pixel shader 237B performs a lookup of a texture for the other partitions using tile texture map 242. In this example, pixel shader 237B uses tile texture map 242 to retrieve the black solid color for the pixel corresponding to partition 308N. Additionally, pixel shader 237A uses solid texture map 402 to look up a texture for partitions 308A-308D, 308I-308L, and 308N-308P.

A solid texture map including the major color may provide for a reduction in bandwidth and power consumption. In particular, rather including the major color in the solid texture map for each partition that is the major color, the major color is only included once. In this example, all partitions corresponding to a "T" value are the major color. Additionally, frame rate performance may be improved for the tiles with a lot of solid color partitions. On the tiles with few or no solid partitions, however, the overhead of doing extra work in pixel shader 237 may slow down the performance and consume more power. On these tiles, normal texture lookup may tend to work better. Therefore, adaptive selection of pixel shader 237A or pixel shader 237B based on a threshold of the percentage or threshold number of solid color partitions of each texture may be helpful. In an example, if the threshold is reached, pixel shader 237A uses solid texture map 402 and pixel shader 237B uses tile texture map 242. In this example, pixel shader 237 may include a "modified" pixel shader (e.g., pixel shader 237A) that uses solid texture map 402 to render a pixel on display 118. Additionally, if the threshold is not reached, pixel shader 237 may use an "unmodified" pixel shader (e.g., pixel shader 237B) that uses tile texture map 242 to render a pixel on display 118.

Pixel shader 237 may look up a texture using tile texture map 242 or solid texture map 402. In some embodiments, pixel shader 237 determines if a particular pixel to be rendered on display 118 maps to a partition with a solid color. In response to determining that the particular pixel maps to a partition that is a solid color, pixel shader 237A may be adaptively selected and may use solid texture map 402 to look up the texture. In response to determining that the particular pixel maps to a partition that is not a solid color, pixel shader 237B may be adaptively selected and may use tile texture map 242 stored in memory 110 to look up the texture.

In some embodiments, pixel shader 237 may be provided with access to solid texture map 402 corresponding to a tile and determines whether the tile has a threshold percentage of partitions that is a solid color. In response to determining that the respective tile has the threshold percentage of partitions that is a solid color, pixel shader 237A may perform a texture lookup using solid texture map 402. In an example, pixel shader 237A retrieves the color pixel-by-pixel based on the xy-coordinates for the non-solid partitions of the tile. For solid partitions, pixel shader 237A may perform a lookup only using solid texture map 402 because it has the color information. Additionally, pixel shader 237B may retrieve the color pixel-by-pixel based on the xy-coordinates for the rest of the tile.

In contrast, in response to determining that the respective tile does not have the threshold percentage of partitions that is a solid color, pixel shader 237B may perform a texture lookup using tile texture map 242. In an example, pixel shader 237B performs the texture lookups for all partitions only using tile texture map 242 stored in texture memory.

Pixel shader 237 provides an output 438 that stores a 2D image. In an example, output 438 is a frame buffer allocated from memory 110. Fragments can be discarded or passed on to the frame buffer, and the final image may be passed on to the drawing buffer and shown to the user or alternatively saved to an off-screen buffer for later usage such as to save as texture data.

As discussed above and further emphasized here, FIGS. 1-5 are merely examples, which should not unduly limit the scope of the claims. For example, the techniques described in this disclosure may be implemented in any of the components shown in FIG. 2 including, e.g., graphics API 226, GPU driver 228, command engine 232 and processing units 234. For example, the techniques for rendering a texture or texture mapping may be implemented in command engine 232 and/or in a graphics pipeline implemented by processing units 234.

Figure 6:
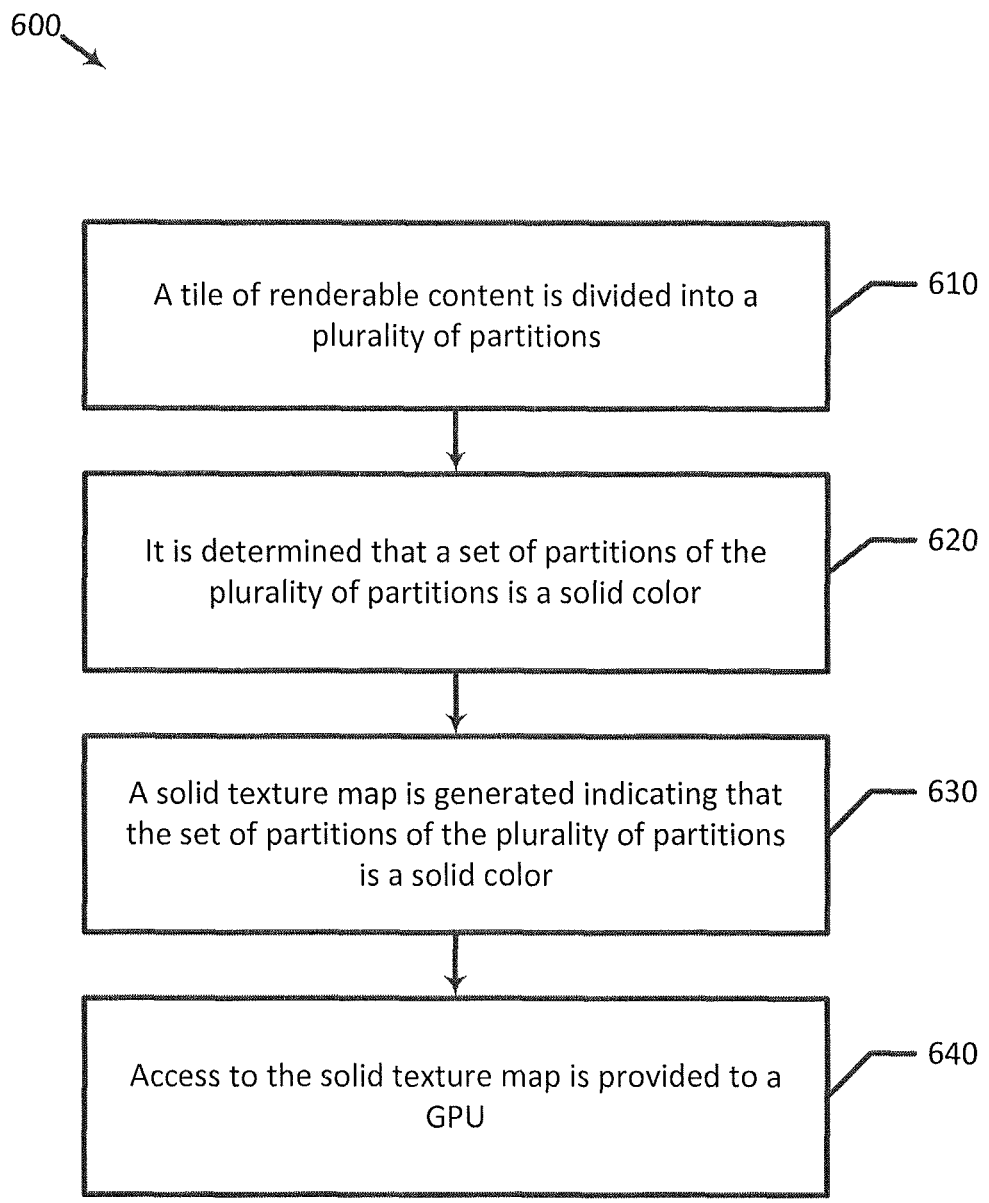
FIG. 6 is a simplified flowchart illustrating a method for providing a texture map to the GPU, according to some embodiments.

FIG. 6 is a simplified flowchart illustrating a method 600 for providing a texture map to a GPU, according to some embodiments. Method 600 is not meant to be limiting and may be used in other applications.

Method 600 includes blocks 610-640. In a block 610, a tile of renderable content is divided into a plurality of partitions. In an example, tile generator 410 divides tile 306A of renderable content into plurality of partitions 308. In a block 620, it is determined that a set of partitions of the plurality of partitions is a solid color. In an example, tile generator 410 determines that partitions 308E-308H and 308M of plurality of partitions 308 is a solid color. In a block 630, a solid texture map is generated indicating that the set of partitions of the plurality of partitions is a solid color. In an example, solid texture map generator 412 generates solid texture map 402 indicating that the set of partitions of the plurality of partitions is a solid color. In a block 640, access to the solid texture map is provided to a GPU. In an example, solid texture map generator 412 provides access to solid texture map 402 to GPU 112.

In some embodiments, blocks 610-640 may be performed for any number of occurrences of any number of layers or tiles of the renderable content. It is also understood that additional processes may be performed before, during, or after blocks 610-640 discussed above. It is also understood that one or more of the blocks of method 600 described herein may be omitted, combined, or performed in a different sequence as desired Those of skill would further appreciate that the various illustrative logical blocks, configurations, modules, circuits, and steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The blocks or actions of a method described in connection with the embodiments disclosed herein may be embodied directly in hardware, in a software module executed by a processor, or in a combination of the two. A software module (e.g., browser 224, tile generator 410, or solid texture map generator 412) may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. Software modules may execute on one or more processors. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims. Thus, the present disclosure is limited only by the claims.

What is claimed is:

1. A method of providing a solid texture map to a graphics processing unit (GPU), comprising:
    dividing a tile of renderable content into a plurality of partitions including a first set of partitions and a second set of partitions;
    determining that the first set of partitions is a solid color;
    generating a solid texture map indicating that the first set of partitions is a solid color and the second set of partitions is not a solid color; and
    providing access to the solid texture map to a GPU.

2. The method of claim 1, further comprising:
    dividing a webpage into one or more layers; and
    dividing a layer of the one or more layers into a plurality of tiles.

3. The method of claim 1, wherein the dividing includes dividing the tile into a plurality of horizontal or vertical partitions.

4. The method of claim 1, further comprising:
    determining, for each partition of the set of partitions, a color of the respective partition, wherein the solid texture map includes the respective color.

5. The method of claim 1, further comprising:
    determining a major solid color of the tile, wherein the solid texture map includes the major solid color.

6. The method of claim 1, wherein determining that the first set of partitions is a solid color includes determining, by a client application, that the first set of partitions is a solid color, wherein generating the solid texture map includes, generating, by the client application, the solid texture map, and wherein providing access to the solid texture map includes storing, by the client application, the solid texture map into texture memory accessible by the GPU.

7. The method of claim 1, wherein the solid texture map includes an entry for each partition of the plurality of partitions, and each respective entry indicates whether a corresponding partition is a solid color.

8. The method of claim 1, wherein the solid texture map indicates that the first set of partitions is a first solid color, the method further comprising:
    determining that a third set of partitions is a second solid color, the solid texture map indicating that the third set of partitions is the second solid color.

9. The method of claim 1, further comprising:
    determining whether a number of partitions in the first set of partitions satisfies a threshold, wherein generating the solid texture map includes in response to determining that the number of partitions satisfies the threshold, generating the solid texture map.

10. The method of claim 1, further comprising:
    determining whether the tile has a threshold percentage of partitions that is a solid color, wherein generating the solid texture map includes in response to determining that the tile has the threshold percentage of partitions that is a solid color, generating the solid texture map.

11. The method of claim 1, wherein a first partition of the first set of partitions is a different color than a second partition of the plurality of partitions.

12. The method of claim 5, wherein at least one partition of the second set of partitions is a solid color that is different from the major solid color.

13. A system for providing a solid texture map to a graphics processing unit (GPU), comprising:
    a tile generator executing on a computing device, wherein the tile generator divides a tile of renderable content into a plurality of partitions including a first set of partitions and a second set of partitions, and determines that the first set of partitions is a solid color; and
    a solid texture map generator that generates a solid texture map indicating that the first set of partitions is a solid color and the second set of partitions is not a solid color, and provides access to the solid texture map to a GPU.

14. The system of claim 13, wherein the tile generator divides a webpage into one or more layers and divides a layer of the one or more layers into a plurality of tiles.

15. The system of claim 13, wherein the tile generator divides the tile into a plurality of horizontal or vertical partitions.

16. The system of claim 13, wherein the tile generator determines, for each partition of the set of partitions, a color of the respective partition, and wherein the solid texture map includes the respective color.

17. The system of claim 13, wherein the tile generator determines a major solid color of the tile, and wherein the solid texture map includes the major solid color.

18. The system of claim 13, further comprising:
    a client application including the tile generator and the solid texture map generator, wherein the client application issues one or more instructions causing the GPU to execute one or more draw call commands associated with the solid texture map, and the solid texture map generator stores the solid texture map into texture memory accessible by the GPU.

19. The system of claim 13, wherein the GPU includes a pixel shader, wherein the solid texture map generator determines whether the plurality of partitions satisfies a condition, wherein if the plurality of partitions satisfies the condition, the solid texture map generator generates the solid texture map, wherein if the plurality of partitions does not satisfy the condition, for each pixel, the pixel shader performs per-pixel shading computations by performing a texture lookup for a current texture coordinate by accessing a tile texture map stored in a memory.

20. A computer-readable medium having stored thereon computer-executable instructions for performing operations, comprising:
    dividing a tile of renderable content into a plurality of partitions including a first set of partitions and a second set of partitions;
    determining that the first set of partitions is a solid color;
    generating a solid texture map indicating that the first set of partitions is a solid color and the second set of partitions is not a solid color; and
    providing access to the solid texture map to a GPU.

* * * * *